Patented Oct. 10, 1944

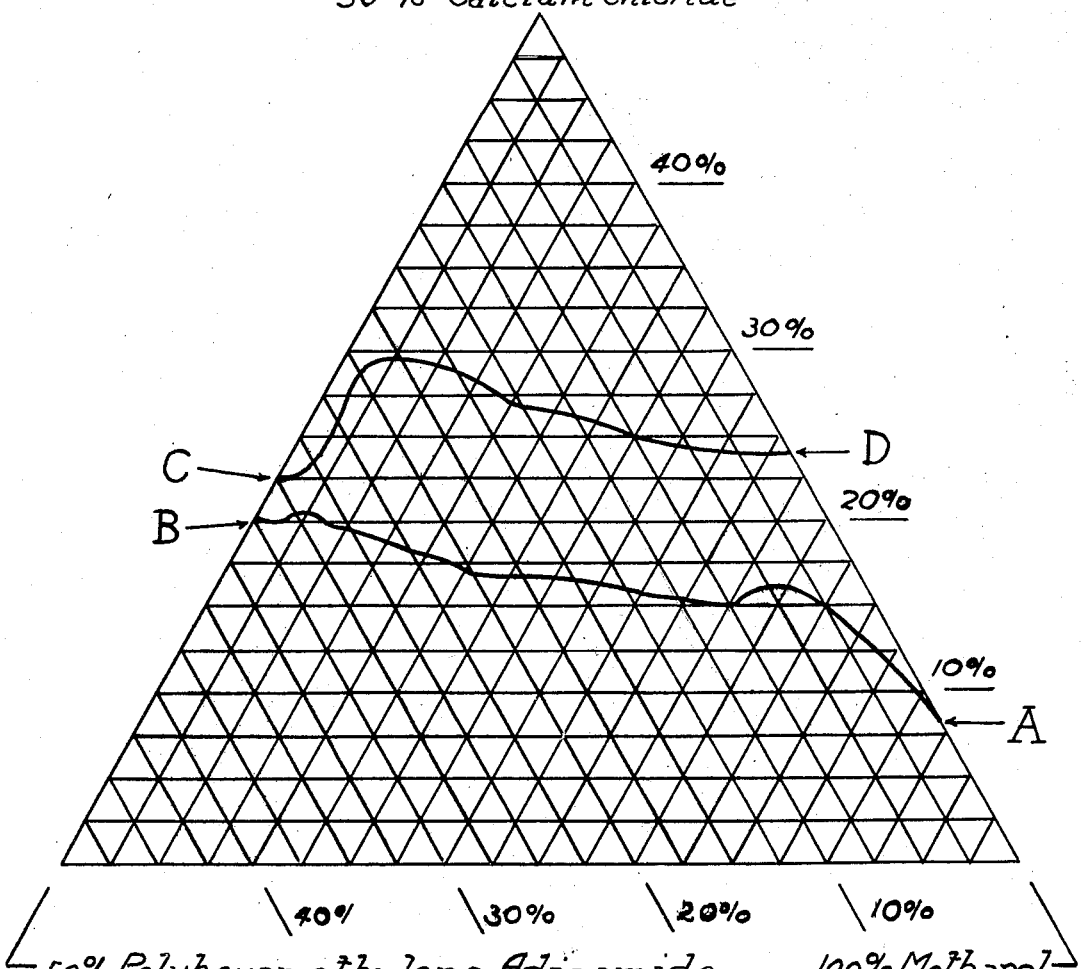

2,359,877

UNITED STATES PATENT OFFICE 2,359,877

POLYMERIC COMPOSITIONS

Orion E. Schupp, Jr., Wilmington, Del., assignor to E. I. du Pont de Nemours & Company, Wilmington, Del., a corporation of Delaware Application October 24, 1940, Serial No. 362,660

11 Claims. (Cl. 260—29)

This invention relates to new compositions of matter comprising synthetic linear polyamides of the types described in U. S. Patents 2,071,250, 2,071,253, and 2,130,948. These polyamides contain amide groups

where R is hydrogen or a monovalent hydrocarbon radical) as an integral part of the main chain of atoms in the polymer. Further, the average number of carbon atoms in the segments of the chain separating the amide groups in these polyamides is at least two. Accordingly, in this specification and the claims appended hereto, the expression, synthetic linear polyamide, is to be understood as applying to polyamides not only belonging to types described in the aforesaid patents, but also coming within the limitations pointed out in this paragraph. The aforesaid synthetic linear polyamides for convenience will be referred to at times hereinafter, simply as polyamides.

This invention relates particularly to the provision of relatively non-corrosive and non-degrading solutions of the polyamides.

Although the polyamides as a class are microcrystalline and have fairly high and sharp melting points, they can be formed into many useful objects without the use of solvents, as, e. g., by spinning, extruding, or otherwise forming the object from the molten polyamide. There are certain advantages, however, in the use of solutions rather than molten compositions, to achieve the fluid state necessary in lacquers, coating compositions and dopes suitable for use in forming objects such as films, sheets, ribbons, bristles, and filaments. For example, in coating fabrics, paper, or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time, and in that event it is convenient if the composition can be kept in the liquid state by storage at ordinary temperatures. The application of such solutions as lacquers and adhesives is much more easily carried out by methods well known to the art than is the application of a molten composition. Further, the incorporation of plasticizers or other modifying agents into polyamides could frequently be accomplished more advantageously by addition of the plasticizer to a solution of the polyamide rather than to a molten polyamide, thus minimizing the tendency toward discoloration and decomposition which frequently occurs when blending is done with a melt. Again, there is a tendency with certain types of plasticizers and modifying agents to be less compatible at the high temperatures required for blending in a melt, whereas they can be readily incorporated in a polyamide solution at a low temperature. A still further advantage in the use of solutions lies in the ease with which they can be cast into films or coatings of uniform thickness, which is mechanically more difficult to accomplish with a molten composition due to its relatively high viscosity.

The polyamides as a class characteristically require corrosive media such as strong or concentrated acids, phenols, cresols and the like, as solvents, where solutions of the polyamides having useful degrees of concentration are needed. And even in the case of some of the more soluble types, which have been found to be soluble in higher alcohols at elevated temperatures or in heated mixtures of lower alcohols with other liquids such as chlorinated hydrocarbons or water, instability of solution and gelation on cooling have occasioned considerable difficulty. Furthermore, and particularly when acids are used as solvents, degradation of the polyamide constitutes a serious obstacle, especially at higher temperatures and concentrations, and even when phenolic solvents are employed.

Because of the acute scarcity of solvents which are suitable for the more usual types of polyamides, from the standpoints of non-corrosiveness, low-cost and solvent power, as well as from the standpoint of ease of recovery for reuse, a serious demand has existed for the discovery of solvents with which polyamide solutions of suitable concentration and stability can be prepared conveniently, economically, and with maximum safety both to personnel and to equipment, and which can readily and conveniently be recovered for reuse or re-cycling during the employment of the polyamide solutions for transforming the polyamides into readily dispersible solid particles, e. g., or into other forms.

This invention therefore has as an object the preparation of polyamide solutions in relatively non-hazardous, non-corrosive, non-degrading, and non-expensive solvents. The invention also has as an object the provision of a method for imparting solubility to, or increasing the solubility of solvent media for, the polyamides, as well as the enhancement of the stability and non-gelation characteristics of polyamide solutions. The invention further has as an object the efficient and economical transformation of the polyamides into fine solid particles, appropriate for use in the production of uniform dispersions in non-solvent liquids. Other objects, including that of forming dispersions of such particles, will appear hereinafter.

The accomplishment of the foregoing objects is made possible by dissolving the polyamides in alcohol solutions of metal salts, preferably in solutions of metal salts in the lower aliphatic alcohols. This expedient has been found especially useful in cases where the alcohol alone is a non-solvent for the polyamide.

In most cases polymer solutions of high solids content and good stability can be conveniently prepared by agitating the polymer with the solvent mixture at room temperature or at slightly higher temperatures. In some cases, however, it is advantageous to agitate the polymer with the solvent mixture at the boiling point of the latter, under a reflux condenser. A given solvent medium may have only a swelling action on a given polymer at room temperature, forming a rigid or non-fluid gel. A gel of this type can usually be dispersed to a fluid solution by heating to a minimum temperature which varies with the nature of the composition. Solutions prepared in this manner will solidify again to a gel after cooling to room temperatures or below the minimum temperature required to effect solution originally. The time interval which elapses before a gel is formed varies with the nature of the polymer, the solvent medium and the plasticizers or other materials present in the composition. In some cases such super-cooled solutions can be handled at room temperature for as long as several days before gel formation occurs. In other cases, a gel may be formed within several minutes after cooling to room temperature.

It sometimes is of advantage to use an unstable solution in the formation of films, fibers, coatings, or other objects by processes involving solvent evaporation. For example, if a solution is cooled to temperatures in the range where gel formation can eventually occur but is sufficiently delayed to permit the casting, coating, or desired manipulation to be carried out while the composition is still fluid, the solution usually will have a higher viscosity than at temperature levels of such height that gel formation cannot occur. The increased viscosity may be of particular advantage when the solutions are to be cast or applied as thick coatings or films, since a viscous coating tends to retain its shape during the time interval required for solvent evaporation to produce a self-supporting coating or film. It frequently is possible, by continued agitation of a super-cooled solution, to prevent the formation of a gel at temperatures below which gel formation would otherwise occur, and this procedure can be used to advantage in practicing the present invention.

When it is desired to utilize the solutions of the invention for the production of dispersible particles of the polyamide, alcohol-salt-polyamide solutions are diluted with a non-solvent for the polyamide, thus causing precipitation of the latter. A preferred non-solvent for use in the accomplishment of this objective is an excess of the same alcohol as that used in forming the said solution. Recovery of the alcohol by simple distillation, without any need for separation of other liquids therefrom, thus is made possible, along with maximum convenience in re-cycling the alcohol; whereas purification by fractionation or otherwise ordinarily would be necessitated if the precipitation were effected by dilution of the alcohol-salt-polyamide solution with, or introduction of the same into, a precipitating medium different from the said alcohol.

The salts employed in the practice of the invention are metal salts which are alcohol soluble, and substantially inert to the polyamide. In general, the best results have been obtained with those salts whose acid radicals or groups are halide or nitrate, and whose metal ions are elements under 31 in atomic number and fall within the first or second group of the periodic system. The chlorides, bromides, and nitrates of lithium, calcium, and zinc are particularly effective.

The alcohols employed in the practice of the invention may be saturated or unsaturated. The preferred alcohols are aliphatic alcohols having less than 6 carbon atoms, and particularly those having less than 4 carbon atoms. The limited solubility of the above-stated salts in the higher aliphatic alcohols renders the latter unsatisfactory for the purposes of the invention.

In a preferred embodiment of the invention solutions of polyhexamethylene adipamide in essentially saturated solutions of anhydrous calcium chloride in methanol are prepared. Calcium chloride dissolves in methanol to give an approximately 25% solution at room temperature, i. e., about 25° C. Agitated in such a solution at room temperatures, or preferably at elevated temperatures, polyhexamethylene adipamide chips readily dissolve to form viscous, clear, colorless, and stable solutions. With a stable solution defined as one not gelling within 24 hours at 25° C., stable solutions as concentrated as 24% of polyhexamethylene adipamide, 20% of calcium chloride, and 56% of methanol are readily obtained. It should be understood, however, that utility is not limited to solutions which are stable for at least 24 hours at room temperature. Solutions which gel at room temperature can be used at higher temperatures to prevent gelation.

Figure 1 shows the range of solutions, stable at 25° C., which are possible with polyhexamethylene adipamide, calcium chloride, and methanol. Such solutions are stable with respect to both gelation and polymer degradation.

Solutions kept above the gelation temperature maintain a constant viscosity for months, indicating no polymer degradation.

The following examples, in which parts are by weight, serve to illustrate the properties and behavior of polyamide-calcium chloride-methanol solutions.

*Example I*

A mixture comprising 500 parts of waste polyhexamethylene adipamide fiber, 500 parts of anhydrous calcium chloride and 1500 parts of methanol is placed in a ball mill, warmed to 45° C., and milled for several hours. A very viscous solution results, which is stable at 25° C. Films cast from the solution at room temperature were somewhat cloudy, due to absorption of water from the atmosphere. Films cast at elevated temperatures, e. g., 60° C., were clear, transparent and colorless, until leached with water to remove the calcium salt, whereupon the films assumed an attractive, opaque white appearance, together with unusual softness and porosity.

Employment of the polyamide-calcium chloride-methanol solutions for the preparation of finely divided polyamide particles or dispersions of the same, is illustrated in the following three examples.

Example II

A solution containing 10 parts of polyhexamethylene adipamide, 22.5 parts of calcium chloride, and 67.5 parts of methanol is atomized into 450 parts of rapidly agitated methanol. The polyhexamethylene adipamide, which separates in finely divided form, is removed from the liquid by centrifuging and washed with water until free of calcium chloride. The centrifuged cake, consisting of finely divided polyamide particles, is dispersed in water by milling in a colloid mill. The particles of dispersed polyamide are 4 microns or less in diameter, but may be somewhat flocculated. They can be deflocculated, if desired, by addition of a small amount of soap, casein, the products known to the trade as "Gardinol" and "Leukanol," or by various other dispersing agents. Deflocculation decreases the viscosity of the dispersion, permitting the solids content to be raised from 10 to 16% with preservation of workable fluidity.

When the dispersion is utilized for the application of a polyamide coating to an object, the dispersion medium conveniently may be removed by evaporation, after the application of the dispersion to the object, and the residual particles of polyamide then may be melted in situ.

Example III

A solution containing 10 parts of polyhexamethylene adipamide, 22.5 parts of calcium chloride, and 67.5 parts of methanol is evaporated to dryness to 100° C., the last of the methanol being removed under reduced pressure. The friable dry mass consisting of polyhexamethylene adipamide and calcium chloride is ground in a ball mill. When the desired particle size is reached, further grinding of the powder in the presence of water serves to remove the calcium chloride. The powdered polyamide then may be filtered off and dried, or redispersed in water, as described in Example II. The powdery polymer can also be used as such as an ingredient in pigments, cosmetics or frits, e. g., for application to metals, ceramic ware, fabrics or other surfaces by heat fusion.

Example IV

A solution containing 20 parts of polyhexamethylene adipamide, 20 parts of calcium chloride and 60 parts of methanol is precipitated by pouring it in a thin stream of water. The polymer precipitates in spongy weak filaments. The precipitated polyamide is washed with water until it is free of calcium chloride, and then is dried. The completely dried polymer is very brittle and can easily be ground to fine powder by ball milling. The finely divided polyamide may then be dispersed in water by ball milling, through the use of a Disper-mill, or by other methods of dispersing finely divided materials.

The foregoing examples have referred to solutions of polyhexamethylene adipamide in salt-alcohol mixtures, this polyamide being insoluble in lower alcohols except under pressure and at high temperatures. As indicated hereinabove, however, certain other polyamides are soluble in alcohols to a limited degree, or in blends of alcohols with other solvents. But such solutions, as a rule, are stable only at elevated temperatures, or are only stable at room temperatures in dilutions too low to be commercially effective. That both stability and increased concentration of polyamide in solution are obtained by the application of the invention to solutions of soluble polyamides is illustrated in the following two examples.

Example V

A solution containing 18.2% of nonvolatile material is prepared by dissolving 5.9 parts of interpolyamide derived from hexamethylene diammonium adipate and 12-aminostearic acid in a ratio of 40:60, 1.18 parts of 1,12-diphenylol-octadecane, 0.79 part of propyleneglycol-castor oil reaction product, and 0.87 part of calcium chloride in 39.3 parts of a warmed, mixed solvent comprising 75 parts of 95% ethanol (wt.), 20 parts toluene, and 5 parts of water. The most concentrated solution of suitable stability which could be prepared with the said ingredients, in the absence of the calcium chloride, was only 10%. The solution was cast to a 5-mil film by drying at 65° C. and the film leached in water and dried to a clear, nonhydroscopic film having a tensile strength of 1700 lbs./sq. in. at 25° C., at 50% relative humidity.

Example VI

A pigment dispersion is prepared by ball milling a mixture of 699.6 parts of bone black, 110.4 parts of ultramarine pigment, 567 parts of butyl phthalyl butyl glycolate, and 508.6 parts of amyl-benzene-sulfonamide. One hundred seventy-four and five-tenths parts of the resulting pigment dispersion then is added to a solution which has been prepared by heating and stirring under a reflux 150 parts of an interpolymer derived from hexamethylene diammonium adipate and 6-aminocaproic acid in a 60:40 ratio, 7.6 parts of butyl phthalyl butyl glycolate, 42.6 parts of amyl-benzene-sulfonamide, 344 parts of ethyl alcohol, and 115 parts of water. The composition then is homogenized by heating and stirring under reflux. The solution, when allowed to stand at room temperature, sets to a solid gel in less than eight hours. To 100 parts of the solution is added 2 parts of calcium chloride, and the solution is heated and stirred until homogeneous. This solution does not set to a solid gel until it has stood 23 hours.

Sateen fabric (1.12—53″) was coated with the solution containing calcium chloride (after application of two anchor coats of a solution comprising 60 parts of a polyamide obtained by the terpolymerization of 6-amino caproic acid, hexamethylene diamine and adipic acid, 60 parts of amylbenzenesulfonamide, 90 parts of ethanol, and 30 parts of water) by spreading the solution in a thin film over the fabric, with the aid of a doctor knife, allowing the solvent to evaporate at 65° C. for two minutes, and applying further coatings in the same manner (about 25) until the desired weight of coating had been built up. The glossy pliable product withstood 14,000 flexes on the Schiltknecht flex machine.

Example VII

Ten parts of 6-aminocaproic acid polymer is refluxed with 40 parts of lithium bromide and 30 parts of 96% ethyl alcohol. This gives a clear viscous solution which does not gel on cooling.

Example VIII

Ten parts of caprolactam polymer is dissolved by refluxing in a solution of 20 parts of zinc chloride in 60 parts of ethylene chlorohydrin. The resultant solution does not gel on cooling. On the other hand, when 10 parts of caprolactam polymer is dissolved in 88 parts of boiling ethylene chlorohydrin, the solution gels on cooling.

Example IX

Ten parts of 6-aminocaproic acid polymer is dissolved by refluxing in a solution of 30 parts of zinc chloride in 30 parts of 96% ethyl alcohol. The resultant solution is of low viscosity and does not gel on cooling.

This invention is applicable to synthetic linear polyamides broadly. As additional examples of such polyamides might be mentioned polyhexamethylene sebacamide, polydecamethylene adipamide, poly-meta-phenylene sebacamide, 6-aminocaproic acid polymer, and interpolyamides such as hexamethylene adipamide-decamethylene sebacamide interpolymer, hexamethylene sebacamide-6 aminocaproic acid interpolymer, hexamethylene adipamide-12-aminostearic acid interpolymer, hexamethylene adipamide-caprolactam interpolymer and others. In general, the polyamides used in the practice of this invention are obtainable from polymerizable amino acids or their amide-forming derivatives, from the reaction of diamines with dibasic carboxylic acids or amide-forming derivatives of such acids, or from mixtures of reactants of these types. Under hydrolysis with mineral acids the polyamides produce monomeric amide-forming reactants. For example, a synthetic linear polyamide prepared from a dibasic carboxylic acid and a diamine yields upon hydrolysis with hydrochloric acid the dibasic carboxylic acid and the diamine hydrochloride. Instead of the polyamides mentioned above, which are obtained from bifunctional polyamide-forming reactants as essentially sole reactants, synthetic linear polymers may be employed which have been prepared by including with the polyamide-forming reactants other bifunctional reactants such as amino alcohols and hydroxy acids. Although these products contain ester linkages, they still can be referred to as polyamides since they contain a plurality of amide linkages in the main chain of atoms in the polymer, and retain many of the desirable properties of simple polyamides.

The higher molecular weight polyamides, i. e., those having an intrinsic viscosity above 0.4— intrinsic viscosity being defined as in U. S. 2,130,948—possess the inherent capability of being formed into filaments which can be cold-drawn into fibers showing by characteristic X-ray patterns orientation along the fiber axis. These high molecular weight varieties of the polyamides, though generally somewhat less soluble than the lower molecular weight varieties, are more useful for most purposes, since they excel in toughness and durability.

While the invention has been described in terms of the especially effective and inexpensive methanol solutions of calcium chloride, other alcohol-soluble metal salts may be employed, as already stated. Effective types not specified hereinabove, and not necessarily limited to salts of metals of groups 1 and 2 of the periodic system, are exemplified by magnesium chloride, magnesium nitrate, strontium iodide, strontium nitrate, sodium iodide, calcium iodide, cupric bromide, calcium thiocyanate, and halides of aluminum, titanium, bismuth, cobalt and iron. Calcium thiocyanate and other metal thiocyanates may be considered inorganic salts and are to be understood as included in the term inorganic salt as used herein. In general, salts with good alcohol solubility, i. e., exceeding 5% and preferably over 10%, have marked solvent properties for the synthetic linear polyamides.

The most effective alcohols ordinarily are methanol, ethanol, n-propanol, and iso-propanol, although n-butanol, iso-butanol, 2-ethyl butanol, methallyl alcohol, ethylene glycol, diethylene glycol, benzyl alcohol, ethylene chlorohydrin, and the like are also effective, particularly with zinc salts, such as zinc bromide. Solubility in the longer chain alcohols frequently is improved by the addition of lower alcohols or lower alcohol-salt complexes. Polyhexamethylene adipamide, for example, is fairly soluble in $CaCl_2$ dissolved in a 3:1 mixture of methyl alcohol and n-butyl alcohol, while $CaCl_2$-n-butyl alcohol is much less effective as a solvent for this polymer.

Water is tolerated in lesser or greater amounts by polyamide-salt-alcohol solutions. For example, a viscous solution very slowly setting to a gel is obtained by dissolving 25 parts of polyhexamethylene adipamide in 77 parts by weight of 75% methanol-water and enough $CaCl_2$ to saturate. It may be observed, in this connection, that the solubility of the polyamides in dioxane solutions of zinc bromide is actually enhanced by the addition of small amounts of water.

While saturated salt solutions are the more effective solvents, saturation is not essential for the production of solutions. For example, polyhexamethylene adipamide was dissolved both by cold 24% and 20% solutions of calcium chloride in methanol, and even by a hot 16% calcium chloride solution.

Solutions of polyamides in concentrated solutions of the salt in alcohol can be diluted with varying amounts of non-solvents, for example, chloroform, acetone and the like. The addition of small amounts of alcohol may be tolerated, whereas, if added in larger amounts, the alcohol either may cause slow precipitation, or, if added in sufficient excess, rapid precipitation. In the latter event, the polyamide may separate out in very fine particles. Small amounts of water are tolerated, but large amounts instantly precipitate the polyamide to a spongy mass. Films cast by evaporation of alcohol remain readily alcohol soluble until removal of salt, e. g., by leaching in water.

Solubility of synthetic linear polyamides in salt-alcohol solutions generally increases with elevation of temperature. When a warm, concentrated solution is cooled below the saturation point, slow precipitation or gelation occurs, frequently with the formation of a mush-like gel. Such products find usefulness as adhesives and coating compositions, where it is desired to apply a paste rather than a solution, but true solution properties are redeveloped on warming. The solvent action of the alcohol-salt solution varies with the salt, the alcohol, the polyamide, and the temperature. Increased swelling of polyamides by salt solutions, as compared with the swelling caused by the alcohol alone, is characteristic although for the more insoluble polyamides, in cases where the less effective salts are used, resort to elevated temperatures and pressures may be necessary to the attainment of an appreciable effect. With the considerable range of salts and alcohols which is available, solutions can be prepared having an effect on a given polyamide varying from slight swelling to concentrated solution, as may be desired. In view of the different solubility characteristics of different polyamides, the alcoholic salt solutions can be used as a medium for separating polyamides of different properties by fractional precipitation.

Treatment of a polyamide with alcohol solutions containing insufficient salt to produce solution may greatly embrittle the polyamide, permitting easy mechanical disintegration without solubility. Normal polymer properties of the disintegrated material are restored by suitable removal of the salt, however, as by draining the excess liquid and then leaching in water, alcohol or other salt solvents.

It is within the scope of the invention to modify the solutions with, or use in conjunction with them, pigments, dyes, delusterants, resin, waxes, oils, plasticizers, water-repellents, cellulose derivatives, antioxidants, corrosion inhibitors, metal deactivators, and the like. Particularly useful ingredients for the purpose of increasing the stability of the polymer when exposed for long periods to sunlight or elevated temperatures, include such stabilizing agents as phenothiazine, diphenylguanidine, phenyl α-naphthylamine, and nonheat-hardening resins of the phenol-formaldehyde type, e. g., fusible, soluble resins prepared from p-tertiary-butylphenol and formaldehyde with the aid of an acid catalyst.

The polyamide solutions of the invention are useful for forming a variety of objects, solidification being produced by removal of the alcohol, as by evaporation. Typical objects which thus can be formed are fibers, filaments, bristles, surgical sutures, fishing leaders, fishlines, dental floss, films, ribbons, sheets, safety glass interlayers, sponges, golf ball covers, and plasticized or otherwise modified solid compositions useful in making molded articles. The solutions also are useful for application as lacquers on wood, metal, glass and other surfaces, for coating wire, fabrics, paper, wall paper, regenerated cellulose and the like, and for impregnating fabric, porous structures for bearings and bushings, paper, and fibrous materials generally. Another use for the solutions is as a binder for fibrous structures such as rock wool insulation, glass fiber insulation or glass fiber air filters where the object is to prevent slippage of fiber over fiber. Still another use is in cementing a plurality of polyamide filaments together to form a monofil, e. g., for use as tennis racket strings.

In order to increase the thickness of each layer of coating produced by solvent-evaporative and heating methods, the expedient may be employed of utilizing as a dispersion medium for dispersion of polyamide particles, an alcohol-salt solution already saturated with polyamide, and then applying the resultant dispersion to the object to be coated. On removal of the alcohol a precipitate of polyamide is formed which, together with the particles of polyamide deposited from the dispersion, may be melted by further heating. Thus, the thicknesses yielded by solution coating and dispersion-fusion coating, respectively, as the result of each pass through a heating zone, may be combined.

This invention has been described in terms of the production of solutions of the synthetic linear polyamides in salt-alcohol solutions. In practice, however, dilute or concentrated salt-alcohol solutions alone, i. e., not containing, or not yet containing, any dissolved polyamide, may in themselves have extreme usefulness when used for application to the polyamides. For instance, a salt solution may be used as a polyamide adhesive, dissolving sufficient polyamide before evaporation of the alcohol to produce a good bond. Or, solutions too dilute in salt may serve as potential adhesives, the adhesive power developing on partial evaporation of the alcohol. Such solutions are likewise useful as polyamide sizes, snag resistant finishes for polyamide hosiery, stiffening agents for polyamide fabrics, e. g., for collars, special finishes, etching agents, and the like. They can also be used to lock the ends of pile fibers in the backing of pile fabrics, or to treat the ends of polyamide cords or splices to prevent fraying. They also find usefulness in the recovery of waste polymers from admixture with foreign materials, and for clean-up of polymer-coated equipment. For purposes such as the latter it is desirable to add a corrosion inhibitor, such as a nitrite, to prevent corrosion of metal parts by the calcium chloride or other salt used.

Films cast from the solutions at elevated temperatures, e. g., 60° C., are clear and transparent until extracted with water to remove the calcium chloride, whereupon attractive, relatively soft, submicroscopically porous products, clarifiable by calendering, are obtained. Particularly in the absence of calendering, the said submicroscopically porous products are especially useful and attractive as leather substitutes. Whether or not calendering be employed, however, films useful, e. g., as wrapping tissue and the like are readily cast from the solutions of the invention. Likewise, photographic film furnishes another extensive field of utility for the films.

When pigments are dispersed in the solutions, as by grinding or other recognized methods, the products are useful as printing pastes for fabrics or the like. Precipitation, on the other hand, yields solid polyamide particles which contain, in them, or have occluded in them or on them, pigment particles in relatively large amounts, an accomplishment otherwise difficult to attain. Dispersion of such precipitates may be used as such, or melt blended with other or additional polyamides to give more dilute pigmented systems.

The polyamide solutions are especially useful as adhesives for polyamide films, but the alcohol-salt solutions alone often are similarly effective, when applied to polyamide surfaces, owing to the solution of a small amount of polymer before complete evaporation of the alcohol takes place.

The polyamide solutions can also be used as adhesives for shoes, boxes, cloth, leather, regenerated cellulose, glass, wood, e. g., for making plywood, and for other articles.

Filaments can be dry spun, followed by leaching to remove the salt, if desired, or wet spun into suitable coagulating baths; or the two processes may be combined. Filaments obtained by these methods have a rougher surface and a more porous structure than those obtained by melt spinning. Staple fibers made by cutting these filaments, therefore, can be spun into yarns more readily than staple fibers made from melt spun filaments. Fibers having a rough and somewhat opaque surface can also be prepared by treating smooth polyamide filaments with an alcoholic solution of a metal salt, e. g., a dilute $CaCl_2$ solution in methanol, for a short time and then washing the filaments before they are substantially weakened. Fabrics and films can be treated similarly. Coatings on a fabric base, followed by water leaching, are more permeable than coatings deposited from solutions in more volatile solvents. Such permeability is particularly desirable for many purposes, e. g., when the compositions are applied to the fabrics of shoe uppers.

Solutions of different polyamides, or of polyamides with other polymers or solutes, can be solution blended and precipitated to give homogeneous blends, where melt blending is undesirable or impractical. Blends with silk fibroin thus may be obtained, since this material has been found to be soluble in alcohol-salt solutions such as zinc chloride-methanol.

As many apparently widely different embodiments of this invention may be made without departing from the spirit and scope thereof, it is to be understood that the invention is not limited to the specific embodiments thereof except as defined in the appended claims.

I claim:

1. A process of manufacturing a solution of synthetic linear polycarbonamide wherein the average number of carbon atoms in the segments of the chain separating the amide groups is at least two, said process comprising mixing said polycarbonamide with a solution in an alcohol containing less than 6 carbon atoms of an inorganic salt which is soluble to the extent of at least 5% in said alcohol and which is a salt selected from the class consisting of the halide, nitrate, and thiocyanate salts of a metal of groups I and II of the periodic system having an atomic number less than 31.

2. A process of manufacturing a solution of synthetic linear polycarbonamide wherein the average number of carbon atoms in the segments of the chain separating the amide groups is at least two, said process comprising mixing said polycarbonamide with a substantially saturated solution in an aliphatic alcohol of an inorganic salt which is soluble to the extent of at least 5% in said alcohol and which is a salt selected from the class consisting of the halide, nitrate, and thiocyanate salts of a metal of groups I and II of the periodic system having an atomic number less than 31, said alcohol containing less than 6 carbon atoms and not being per se a solvent for said polycarbonamide.

3. The process of claim 1 wherein the said alcohol is one which per se is not a solvent for the said polycarbonamide.

4. The process of claim 1 in which the said salt is calcium chloride and the said alcohol is methanol.

5. The process of claim 1 in which the said salt is a zinc halide and the said alcohol contains less than 4 carbon atoms.

6. A composition of matter comprising a solution of a synthetic linear polyamide in a solution in an alcohol containing less than 6 carbon atoms of an inorganic salt which is soluble to the extent of at least 5% in said alcohol and which is a salt selected from the class consisting of the halide, nitrate, and the thiocyanate salts of a metal of groups I and II of the periodic system having an atomic number less than 31, said synthetic linear polyamide being a polycarbonamide in which the average number of carbon atoms in the segments of the chain separating the amide groups is at least two.

7. A composition of matter comprising an aliphatic alcohol having in solution therein a synthetic linear polyamide and an inorganic salt which is soluble to the extent of at least 5% in said alcohol and which is a salt selected from the class consisting of the halide, nitrate and thiocyanate salts of a metal of groups I and II of the periodic system having an atomic number less than 31, said synthetic linear polyamide being a polycarbonamide in which the average number of carbon atoms in the segments of the chain separating the amide groups is at least two, said alcohol containing less than 6 carbon atoms and not being per se a solvent for said polycarbonamide.

8. The composition of matter set forth in claim 6 wherein the said salt is calcium chloride.

9. The composition of matter set forth in claim 6 wherein the said alcohol is methanol and the said salt is calcium chloride.

10. A solution of polyhexamethylene adipamide and calcium chloride in methanol, said solution being substantially stable at 25° C. and containing from 5% to 25% of polyhexamethylene adipamide; from 10% to 30% of calcium chloride; and from 45% to 85% of methanol.

11. A substantially stable solution of polyhexamethylene adipamide and calcium chloride in methanol, said solution containing the polyhexamethylene adipamide, calcium chloride and methanol in proportions within the limits represented by the area A, B, C, D in Fig. 1.

ORION E. SCHUPP, Jr.